United States Patent
Prior et al.

(10) Patent No.: US 11,125,174 B1
(45) Date of Patent: Sep. 21, 2021

(54) SYSTEMS AND METHODS FOR PROVIDING SIMULTANEOUS COOLANT STAGNATION AND COOLED EXHAUST GAS RECIRCULATION

(71) Applicants: Gregory P Prior, Birmingham, MI (US); Daniel E Hornback, Davisburg, MI (US); Emily Perkins-Harbin, Ferndale, MI (US); Shreyas Dhond, Rochester Hills, MI (US)

(72) Inventors: Gregory P Prior, Birmingham, MI (US); Daniel E Hornback, Davisburg, MI (US); Emily Perkins-Harbin, Ferndale, MI (US); Shreyas Dhond, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/909,446

(22) Filed: Jun. 23, 2020

(51) Int. Cl.
| | |
|---|---|
| *F02D 41/06* | (2006.01) |
| *F01P 5/12* | (2006.01) |
| *F01P 7/16* | (2006.01) |
| *F02M 26/22* | (2016.01) |
| *B60S 1/02* | (2006.01) |
| *B60H 1/00* | (2006.01) |
| *F01P 5/10* | (2006.01) |
| *F01P 7/14* | (2006.01) |

(52) U.S. Cl.
CPC ............ *F02D 41/064* (2013.01); *B60S 1/023* (2013.01); *F01P 5/12* (2013.01); *F01P 7/16* (2013.01); *F02M 26/22* (2016.02); *B60H 1/00878* (2013.01); *F01P 2005/105* (2013.01); *F01P 2005/125* (2013.01); *F01P 2007/146* (2013.01); *F01P 2060/04* (2013.01); *F01P 2060/08* (2013.01); *F01P 2060/12* (2013.01)

(58) Field of Classification Search
CPC ....... F02D 41/064; F02M 26/22; B60S 1/023; F01P 5/12; F01P 7/16; F01P 2005/105; F01P 2005/125; F01P 2007/146; F01P 2060/04; F01P 2060/08; F01P 2060/12; B60H 1/00878
See application file for complete search history.

(56) References Cited

U.S. PATENT DOCUMENTS

| | | | |
|---|---|---|---|
| 8,146,542 B2 | 4/2012 | Cattani et al. | |
| 9,188,050 B2 | 11/2015 | Naito et al. | |
| 9,670,884 B2 | 6/2017 | Park et al. | |
| 2011/0107983 A1* | 5/2011 | Magro | F02M 26/25 123/41.1 |
| 2017/0253104 A1* | 9/2017 | Amano | B60H 1/00314 |

\* cited by examiner

*Primary Examiner* — Jacob M Amick
(74) *Attorney, Agent, or Firm* — Ralph E. Smith

(57) ABSTRACT

Systems and methods for simultaneously performing engine coolant stagnation and exhaust gas recirculation (EGR) cooler cooling in an engine include providing a coolant circuit configured to flow coolant through both a block of the engine and an EGR cooler of a cooled EGR (CEGR) system of the engine, a main pump on the coolant circuit that is driven by an electric motor or a crankshaft of the engine to pump coolant through a block of the engine, and a secondary pump on the coolant circuit that, when energized, is configured to pump coolant through the coolant circuit, and, during a cold start of the engine, de-energizing the electric motor or disconnecting the main pump from the engine crankshaft to stagnate coolant in the engine block and energizing the secondary pump to flow coolant through the EGR cooler of the CEGR system.

18 Claims, 9 Drawing Sheets

SYSTEMS AND METHODS FOR PROVIDING SIMULTANEOUS COOLANT STAGNATION AND COOLED EXHAUST GAS RECIRCULATION

FIELD

The present application generally relates to engine coolant systems and, more particularly, to systems and methods for providing simultaneous coolant stagnation and cooled exhaust gas recirculation (EGR).

BACKGROUND

Engine coolant stagnation involves stagnating coolant in the engine block during cold starts to more rapidly warm the engine bores, which reduces piston friction and increases engine fuel economy and reduces greenhouse gas (GHG) emissions. Cooled exhaust gas recirculation (cooled EGR, or CEGR) involves cooling and recirculating exhaust gas produced by the engine back into an induction system of the engine, which reduces cylinder pumping losses and increases engine fuel economy and reduces GHG emissions. These two technologies have competing coolant requirements. That is, stagnation requires no coolant flow, whereas CEGR requires continuous coolant flow to prevent boiling within and potential damage to the EGR cooler. Conventional engines therefore only employ one of these technologies (e.g., CEGR only or stagnation only). Accordingly, while these conventional coolant systems do work well for their intended purpose, there remains a need for improvement in the relevant art.

SUMMARY

According to one example aspect of the invention, a coolant system for an engine of a vehicle is presented. In one exemplary implementation, the coolant system comprises: a coolant circuit configured to flow coolant through both a block of the engine and an exhaust gas recirculation (EGR) cooler of a cooled EGR (CEGR) system of the engine, a main pump on the coolant circuit that is selectively driven by an electric motor or a crankshaft of the engine to pump coolant through the engine block, a secondary pump on the coolant circuit that, when energized, is configured to pump coolant through the coolant circuit, and a controller of the engine configured to simultaneously perform engine coolant stagnation and EGR cooler cooling during a cold start of the engine by: de-energizing the electric motor or disconnecting the main pump from the engine crankshaft to stagnate coolant in the engine block to increase engine bore temperature, decrease piston friction, and increase engine fuel economy during cold starts of the engine, and energizing the secondary pump to flow coolant through the EGR cooler of the CEGR system to recirculate cooled exhaust gas to an induction system of the engine to decrease cylinder pumping losses and increase engine fuel economy.

In some implementations, the coolant circuit is a single coolant circuit that provides for both engine block coolant stagnation and EGR cooler coolant flow.

In some implementations, the coolant circuit comprises: a first portion connecting a thermostat valve to the main pump through a cylinder head of the engine and the engine block, a second portion connecting the thermostat valve to the main pump through a radiator of the engine, and a third portion connecting the thermostat valve to the main pump through the EGR cooler, a cabin heater core of the engine, the secondary pump, and an oil heat exchanger of the engine.

In some implementations, the controller is configured to simultaneously perform engine coolant stagnation and EGR cooler cooling by closing the thermostat valve, de-energizing the electric motor or disconnecting the main pump from the engine crankshaft, and energizing the secondary pump to (i) prevent coolant flow through the first portion of the coolant circuit thereby stagnating coolant in the engine cylinder head and the engine block, (ii) prevent coolant flow through the second portion of the coolant circuit, and (iii) provide coolant flow through the third portion of the coolant circuit to cool the EGR cooler.

In some implementations, after the cold start of the engine, the controller is further configured to stop engine coolant stagnation and continue EGR cooler cooling by de-energizing the secondary pump, opening the thermostat valve, and re-energizing the electric motor or reconnecting the main pump to the engine crankshaft to provide coolant flow through the first, second, and third portions of the coolant circuit.

In some implementations, the coolant circuit comprises: a first portion connecting a thermostat valve to the main pump through a cylinder head of the engine and the engine block, a second portion connecting the thermostat valve to the main pump through a radiator of the engine, a third portion connecting the thermostat valve to an oil heat exchanger of the engine through the EGR cooler and a cabin heater core of the engine, a fourth portion connecting the engine oil heat exchanger to either the main pump or the secondary pump through a two-port valve, and a fifth portion connecting the secondary pump to the thermostat valve through the engine cylinder head.

In some implementations, the controller is configured to simultaneously perform engine coolant stagnation and EGR cooler cooling by closing the thermostat valve, de-energizing the electric motor or disconnecting the main pump from the engine crankshaft, opening the two-port valve, and energizing the secondary pump to (i) prevent coolant flow through the first portion of the coolant circuit thereby stagnating coolant in the engine block, (ii) prevent coolant flow through the second and fourth portions of the coolant circuit, (iii) provide coolant flow through the third and fifth portions of the coolant circuit to cool the EGR cooler.

In some implementations, after the cold start of the engine, the controller is further configured to stop engine coolant stagnation and continue EGR cooler cooling by de-energizing the secondary pump, closing the two-port valve opening the thermostat valve, and re-energizing the electric motor or reconnecting the main pump to the engine crankshaft to provide coolant flow through the first, second, third, and fourth portions of the coolant circuit.

In some implementations, flow is stopped to the engine cabin heater core when a current mode of a heating, ventilating, and air conditioning (HVAC) system of the vehicle is an off or cooling mode, and flow is prioritized to the cabin heater core when the current mode of the HVAC system is a defrost or heating mode.

In some implementations, the engine further comprises a turbocharger, and wherein the coolant circuit is further configured to selectively flow coolant through the turbocharger.

According to another example aspect of the invention, a method of simultaneously performing engine coolant stagnation and EGR cooler cooling in an engine of a vehicle is presented. In one exemplary implementation, the method comprises: providing a coolant system comprising a coolant circuit configured to flow coolant through both a block of the engine and an EGR cooler of a CEGR system of the engine, a main pump on the coolant circuit that is driven by an electric motor or a crankshaft of the engine to pump coolant through the engine block, and a secondary pump on the coolant circuit that, when energized, is configured to pump coolant through the coolant circuit, and during a cold start of the engine: de-energizing or disconnecting, by the controller, the electric motor or the main pump from the engine crankshaft, respectively, to stagnate coolant in the engine block to increase engine bore temperature, decrease piston friction, and increase engine fuel economy during cold starts of the engine, and energizing, by the controller, the secondary pump to flow coolant through the EGR cooler of the CEGR system to recirculate cooled exhaust gas to an induction system of the engine to decrease cylinder pumping losses and increase engine fuel economy.

In some implementations, the coolant circuit is a single coolant circuit that provides for both engine block coolant stagnation and EGR cooler coolant flow.

In some implementations, the coolant circuit comprises: a first portion connecting a thermostat valve to the main pump through a cylinder head of the engine and the engine block, a second portion connecting the thermostat valve to the main pump through a radiator of the engine, and a third portion connecting the thermostat valve to the main pump through the EGR cooler, a cabin heater core of the engine, the secondary pump, and an oil heat exchanger of the engine.

In some implementations, simultaneously performing engine coolant stagnation and EGR cooler cooling comprises, by the controller, closing the thermostat valve, de-energizing the electric motor or disconnecting the main pump from the engine crankshaft, and energizing the secondary pump to (i) prevent coolant flow through the first portion of the coolant circuit thereby stagnating coolant in the engine cylinder head and the engine block, (ii) prevent coolant flow through the second portion of the coolant circuit, and (iii) provide coolant flow through the third portion of the coolant circuit to cool the EGR cooler.

In some implementations, the method further comprises after the cold start of the engine, stopping, by the controller, engine coolant stagnation and continue EGR cooler cooling by de-energizing the secondary pump, opening the thermostat valve, and re-energizing the electric motor or reconnecting the main pump to the engine crankshaft to provide coolant flow through the first, second, and third portions of the coolant circuit.

In some implementations, the coolant circuit comprises: a first portion connecting a thermostat valve to the main pump through a cylinder head of the engine and the engine block, a second portion connecting the thermostat valve to the main pump through a radiator of the engine, a third portion connecting the thermostat valve to an oil heat exchanger of the engine through the EGR cooler and a cabin heater core of the engine, a fourth portion connecting the engine oil heat exchanger to either the main pump or the secondary pump through a two-port valve, and a fifth portion connecting the secondary pump to the thermostat valve through the engine cylinder head.

In some implementations, simultaneously performing engine coolant stagnation and EGR cooler cooling comprises, by the controller, closing the thermostat valve, de-energizing the electric motor or disconnecting the main pump from the engine crankshaft, opening the two-port valve, and energizing the secondary pump to (i) prevent coolant flow through the first portion of the coolant circuit thereby stagnating coolant in the engine block, (ii) prevent coolant flow through the second and fourth portions of the coolant circuit, (iii) provide coolant flow through the third and fifth portions of the coolant circuit to cool the EGR cooler.

In some implementations, the method further comprises after the cold start of the engine, stopping, by the controller, engine coolant stagnation and continue EGR cooler cooling by de-energizing the secondary pump, closing the two-port valve opening the thermostat valve, and re-energizing the electric motor or reconnecting the main pump to the engine crankshaft to provide coolant flow through the first, second, third, and fourth portions of the coolant circuit.

In some implementations, flow is stopped to the engine cabin heater core when a current mode of an HVAC system of the vehicle is an off or cooling mode, and wherein flow is prioritized to the cabin heater core when the current mode of the HVAC system is a defrost or heating mode.

In some implementations, the engine further comprises a turbocharger, and wherein the coolant circuit is further configured to selectively flow coolant through the turbocharger.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, engine coolant stagnation and cooled exhaust gas recirculation (cooled EGR, or CEGR) have competing coolant flow requirements. Conventional engines therefore only employ one of these technologies (e.g., CEGR only) or provide independent coolant systems for each, which increases costs and packaging. Thus, an opportunity for improvement exists in the relevant art. Accordingly, improved engine coolant systems and methods of simultaneously performing both coolant stagnation and EGR cooler cooling are presented. These techniques utilize a single coolant circuit and either a secondary pump or a secondary pump and a two-port valve, along with specifically routed coolant lines, to achieve the above-described functionality. By being able to realize the benefits of both of these technologies, engine fuel economy can be increased. More specifically, the fuel economy benefit from the reduced engine pumping losses by using CEGR and the fuel economy benefit from faster engine bore warming and reduced piston friction can both be achieved. In addition, by being able to achieve this using a single cooling circuit instead of independent coolant circuits decreases costs, complexity, and packaging size/weight. Another possible alternative would be to employ independent coolant systems for each of these technologies, although this could increase costs and make packaging more difficult relative to the above-described solution.

Figure 1:
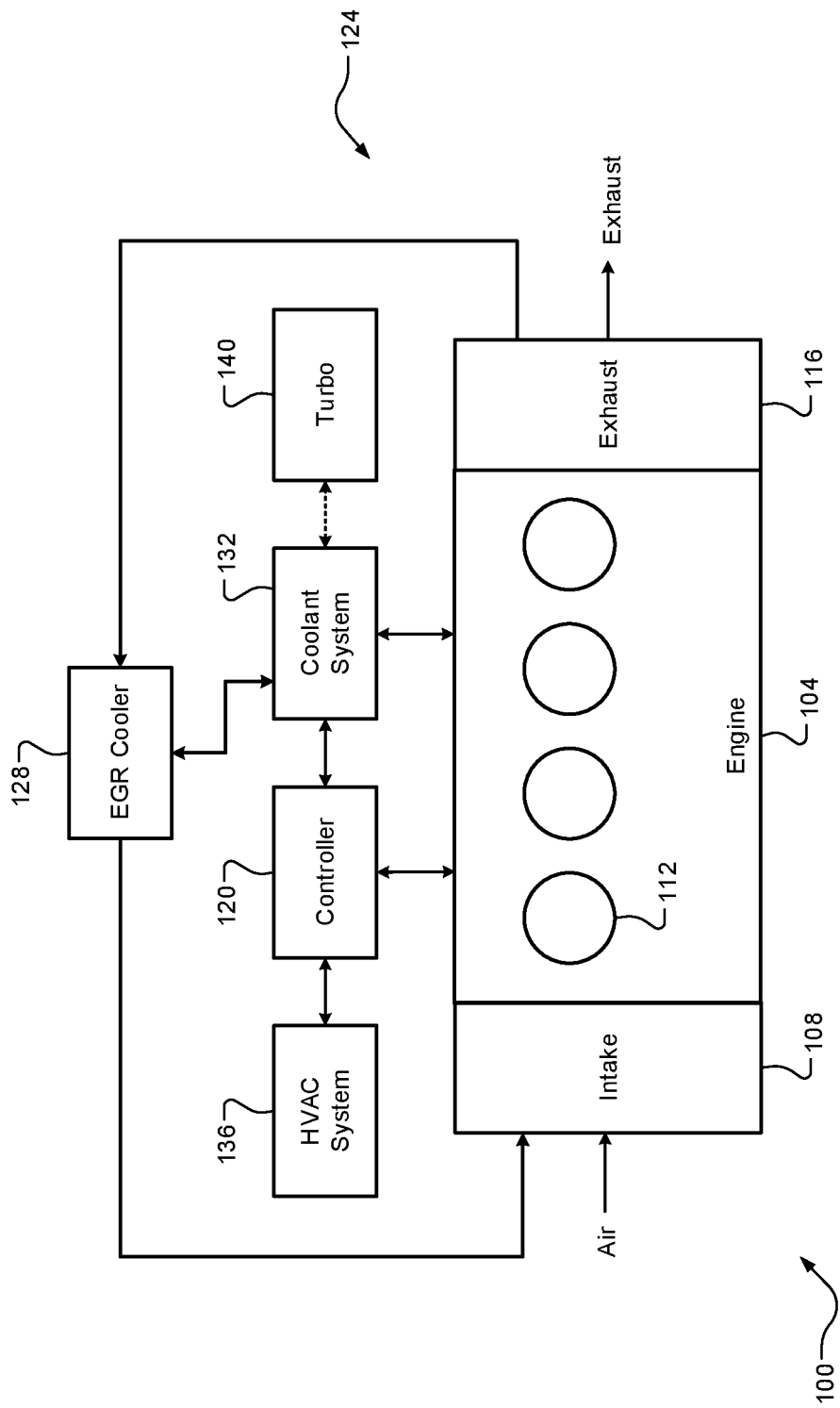
FIG. 1 is a diagram of an example engine including the coolant system according to the principles of the present disclosure.

Referring now to FIG. 1, a functional block diagram of a vehicle 100 comprising an engine 104 having a coolant system 132 according to the principles of the present disclosure is illustrated. The engine 104 draws air through an intake system 108. The air is combined with fuel (gasoline, diesel, etc.) and the air/fuel mixture is compressed and combusted within cylinders 112 to drive pistons (not shown) and generate drive torque. While four cylinders are shown, it will be appreciated that any suitable number of cylinders could be implemented. Exhaust gas resulting from combustion is expelled from the cylinders 112 into an exhaust system 116 that treats the exhaust gas to eliminate or mitigate emissions before being released into the atmosphere. A controller 120 controls operation of the engine 104 (e.g., air/fuel and optional spark) to generate a desired amount of drive torque. Some of the exhaust gas may also be recirculated back to the intake system 108 via an EGR system 124. As shown, the EGR system 124 is a cooled EGR configuration including an EGR cooler 128. A coolant system 132 selectively flows coolant through the engine 104 and the EGR cooler 128 as described in greater detail below. The controller 120 also controls a heating, ventilating, and air conditioning (HVAC) system 136 of the vehicle 100, and a current operating mode of the HVAC system 136 (e.g., as selected by a driver of the vehicle 100) could affect operation or control of the coolant system 132 as described in greater detail below. In some implementations, the engine 104 further comprises a turbocharger 140 that is driven by exhaust gas kinetic energy to increase engine air charge for increased torque output, and the coolant system 132 selectively flows coolant through the turbocharger 140 (e.g., to cool it and improve its operation).

Referring now to FIGS. 2A-2C and 3A, a first example configuration of the coolant system 132 (hereinafter, "coolant system 200") and a corresponding method 300 according to the principles of the present disclosure are illustrated. The engine 104 can be generally divided into two components: an engine block 150, which includes cylinder bores in which the pistons reciprocally move, and a cylinder head 154, which includes rocker arms, intake/exhaust valves, and the like. The movement of the pistons rotatably drives a crankshaft 158 to generate drive torque. This drive torque is primarily transferred to a vehicle driveline for propulsion. Some accessory loads, however, are driven by the crankshaft 158. One such load is a main pump 204 of the coolant system 200, which is selectively connected and disconnected to the crankshaft 158 via a mechanical clutch, a fluid coupling, or other similar connection device 162. It will be appreciated that, in an alternate configuration, the main pump 204 could be driven by a separate electric motor 206 when energized. The coolant system 200 further comprises a thermostat valve 208 (also referred to as "thermostat 208," which could employ a conventional wax motor or be of an electric type), a radiator 212, the EGR cooler 128, a cabin heater core 220, a secondary pump 216, and an oil heat exchanger 224. It will be appreciated that the engine cabin heater core 220 and the engine oil heat exchanger 224 are optional, but their inclusion in the coolant system 200 allows these devices to provide their respective benefits. The same applies for the selective flow of coolant through the turbocharger 140 as previously described.

Figure 2A:
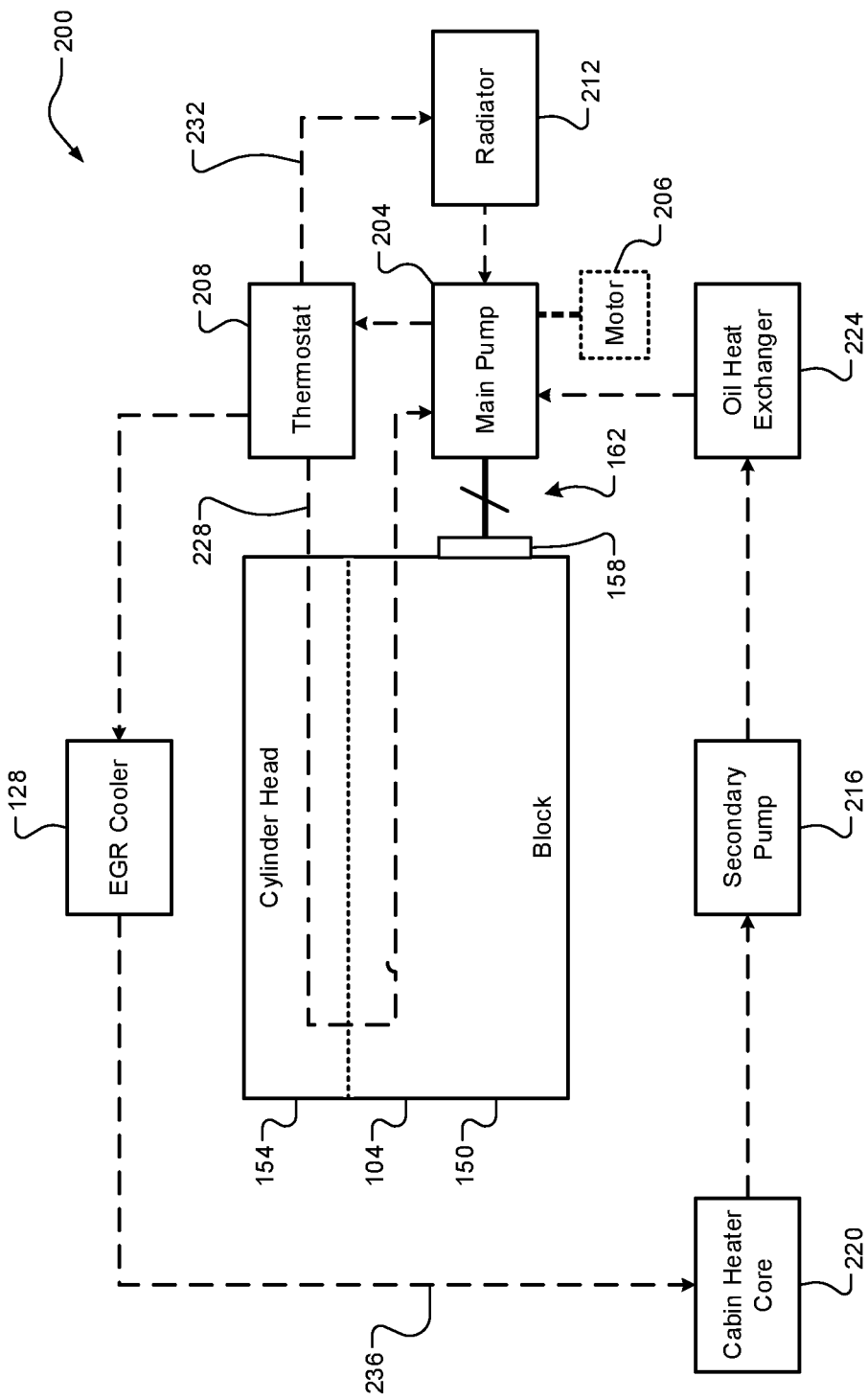
FIGS. 2A-2F are coolant flow diagrams for two different configurations of the coolant system according to the principles of the present disclosure.
Figure 2B:
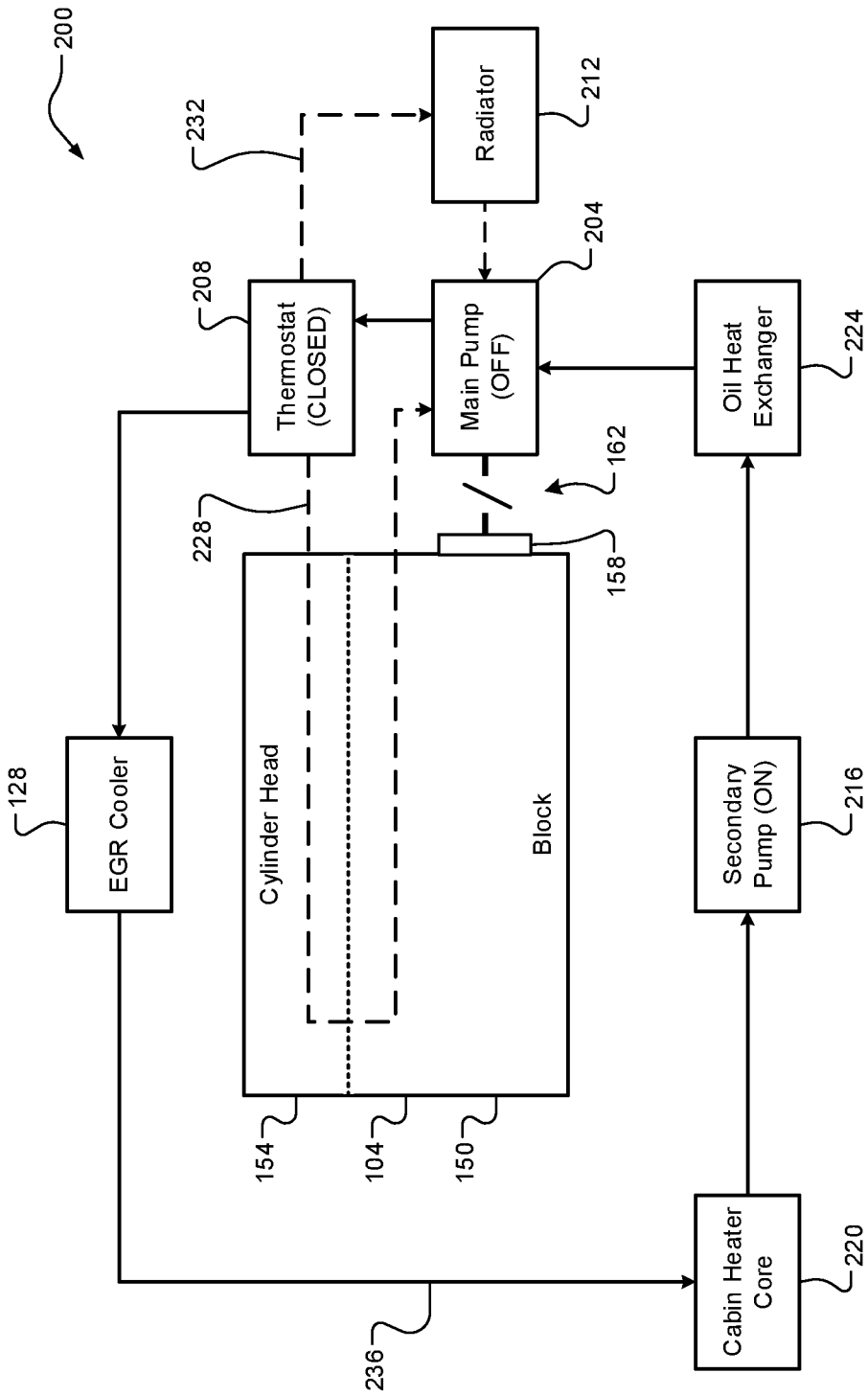
Figure 2C:
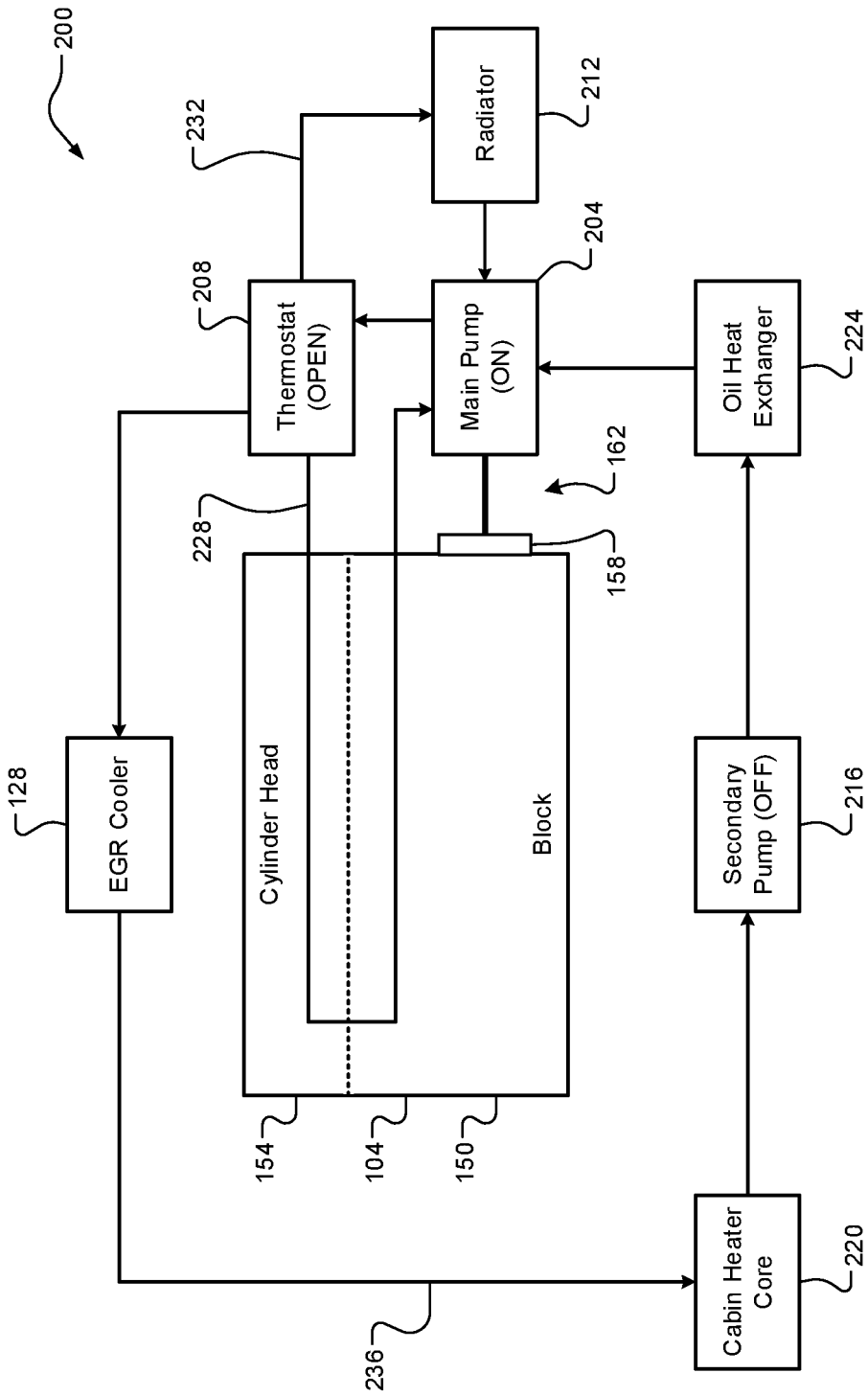
Figure 2D:
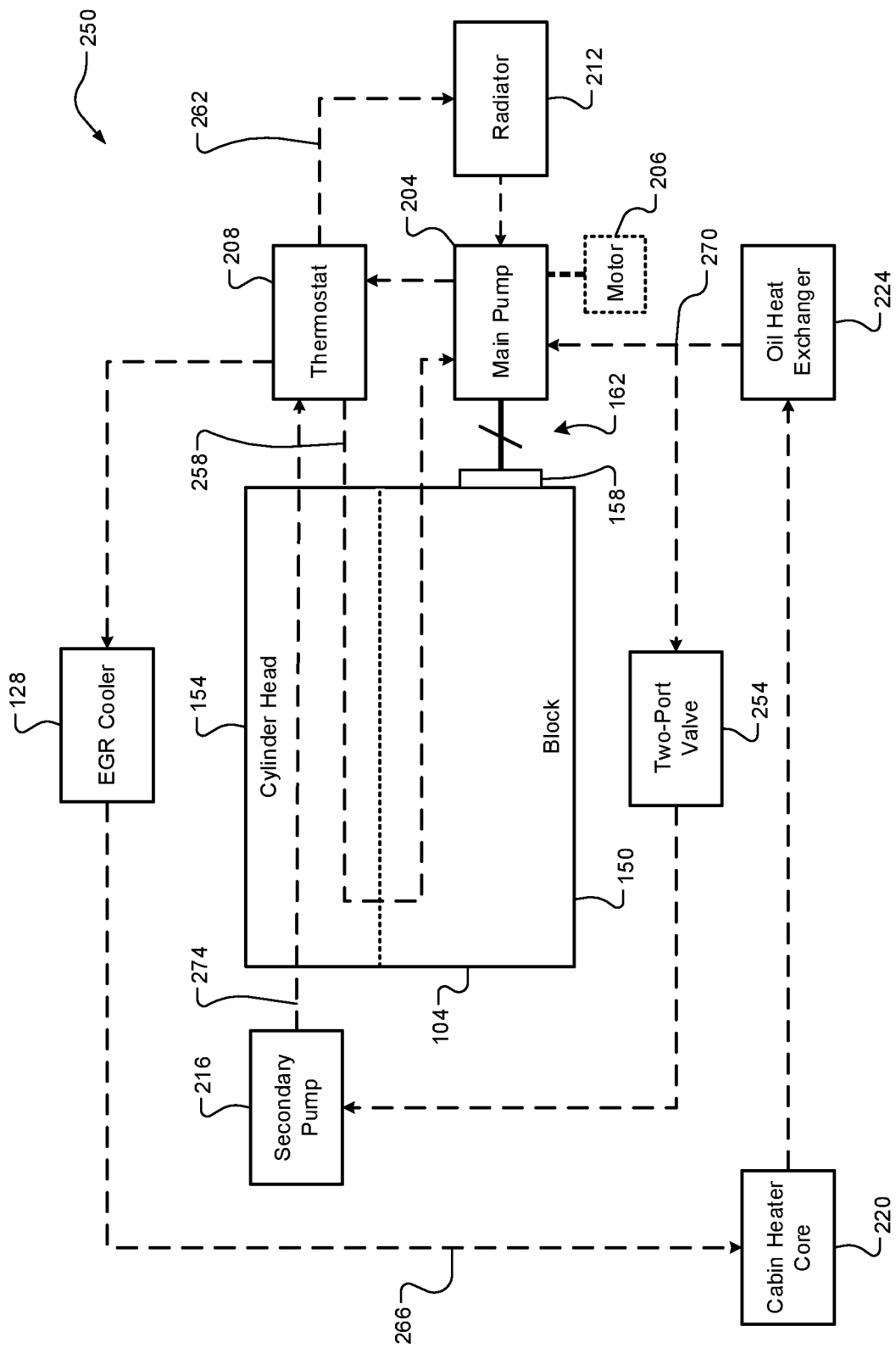

The coolant system 200 comprises a single coolant circuit that is divided into three portions: (i) a first portion 228 connecting the thermostat 208 to the main pump 204 through the engine cylinder head 154 and the engine block 150, (ii) a second portion 232 connecting the thermostat 208 to the main pump 204 through the radiator 212, and (iii) a third portion 236 connecting the thermostat 208 to the main pump 204 through the EGR cooler 128, the engine cabin heater core 220, the secondary pump 216, and the engine oil heat exchanger 224. The controller 120 is configured to control the coolant system 200 as shown in FIG. 2B to simultaneously perform engine coolant stagnation and EGR cooler cooling by closing the thermostat 208, disconnecting the main pump 204 from the crankshaft 158 or de-energizing the electric motor 206, and energizing the secondary pump 216 to (i) prevent coolant flow through the first portion 228 of the coolant circuit thereby stagnating coolant in the engine cylinder head 154 and the engine block 150, (ii) prevent coolant flow through the second portion 232 of the coolant circuit, and (iii) provide coolant flow through the third portion 236 of the coolant circuit to cool the EGR cooler 128. The terms "energizing" and "de-energizing" as used herein refers to an electronic or electric configuration of the electric motor 206 and/or secondary pump 216, but it will be appreciated that any pump/motor configuration that is driven by a source other than the engine 104 could be utilized. After the cold start of the engine 104, the controller 120 is configured control the coolant system 120 as shown in FIG. 2C to stop engine coolant stagnation and continue EGR cooler cooling by de-energizing the secondary pump 216, opening the thermostat 208, and reconnecting the main pump 204 to the engine crankshaft 158 or re-energizing the electric motor 206 to provide coolant flow through the first, second, and third portions 228, 232, and 236 of the coolant circuit. It will be appreciated that the term "cold start" as used herein is not meant to infer a start of the engine 104 in a cold ambient condition, but rather a start of the engine 104 when the engine 104 is near ambient temperature or well below the thermostatically regulated temperature.

Figure 3A:
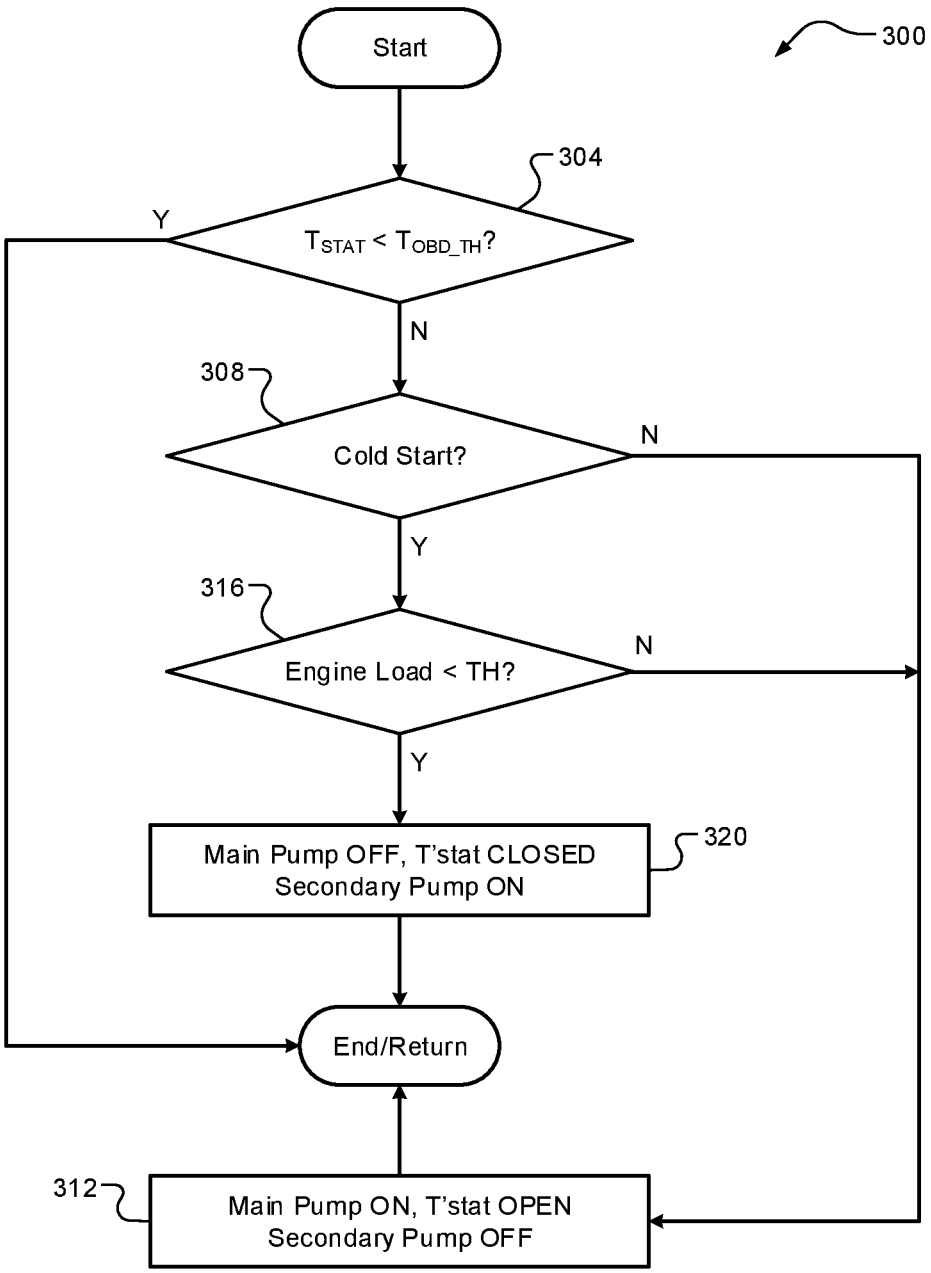
FIGS. 3A-3B are flow diagrams of methods of simultaneously performing coolant stagnation and EGR cooler cooling in an engine according to the principles of the present disclosure.

In FIG. 3A, the corresponding method 300 is illustrated. At 304, the controller 120 could optionally check that a set of preconditions are satisfied, such as the thermostat temperature ($T_{STAT}$) satisfying an on-board diagnostic temperature threshold ($T_{OBD\_TH}$). At 308, the controller 120 determines whether a cold start of the engine 104 is occurring. When false, the method 300 proceeds to 312 where the main pump 204 is connected to the crankshaft 158 or the electric motor 206 is energized (ON), the thermostat 208 ("t'stat") is open (OPEN), and the secondary pump 216 is de-energized (OFF). It will be appreciated that the secondary pump 216 could also run in addition to the main pump 204, such as in cases where higher rates of coolant flow are necessary. The method 300 then ends or returns for one or more additional cycles. When a cold start of the engine 104 is occurring, the method 300 proceeds to 316 where the controller 120 determines whether the engine load is less than a threshold (TH). When false, the method 300 proceeds to 312. Otherwise, the method 300 proceeds to 320 where the main pump 204 is disconnected from the crankshaft 158 or the electric motor 206 is de-energized (OFF), the thermostat 208 is closed (CLOSED), and the secondary pump 216 is energized (ON). The method 300 then ends or returns for one or more additional cycles.

Figure 2E:
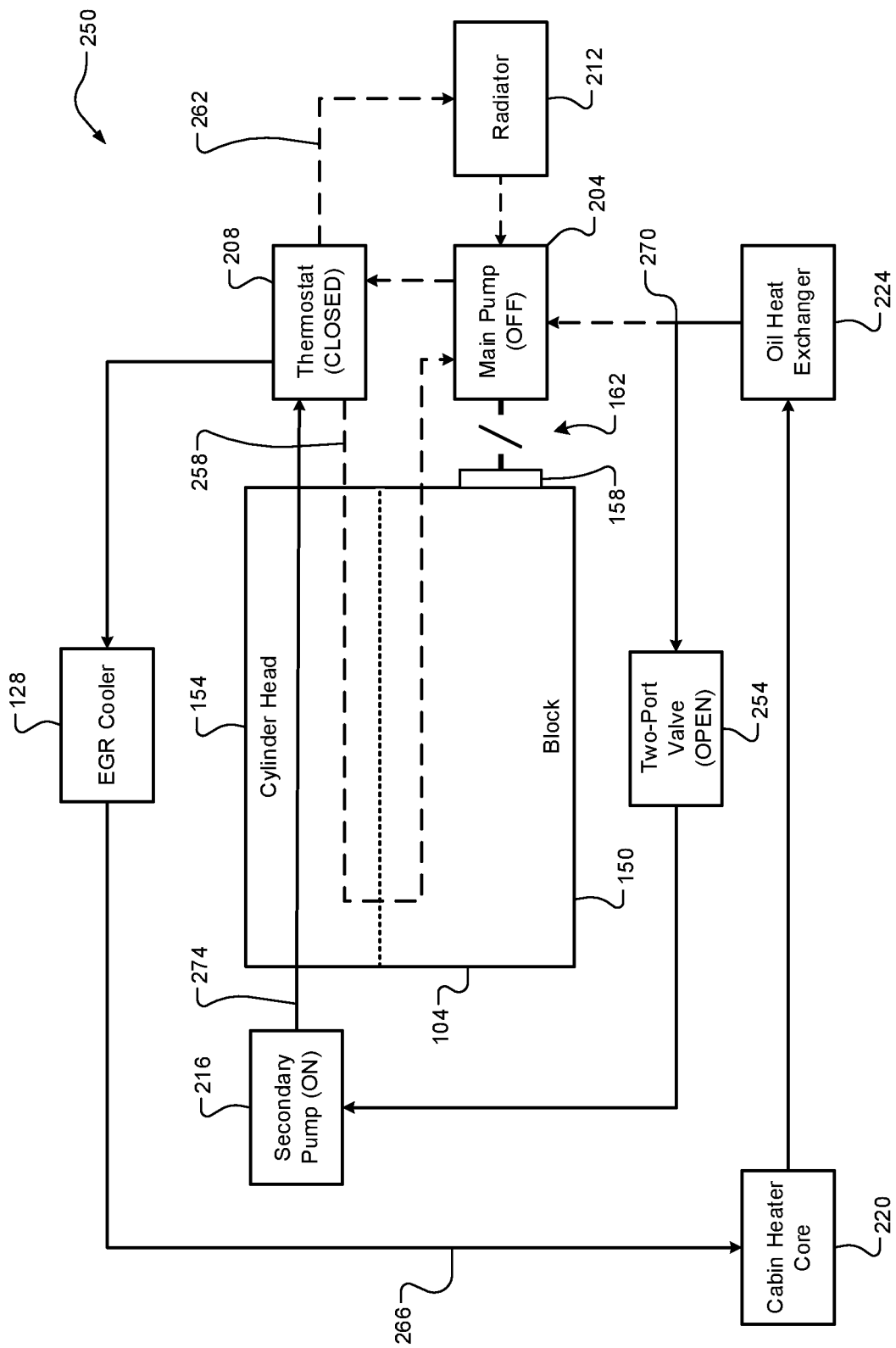

Referring now to FIGS. 2D-2F and 3B, a second example configuration of the coolant system 132 (hereinafter, "coolant system 250") and a corresponding method 350 according to the principles of the present disclosure are illustrated. The primary difference between coolant system 250 and coolant system 200 is the addition of a two-port valve 254, and also a different configuration of the coolant circuit. The coolant system 250 again comprises a single coolant circuit that is divided into five portions: (i) a first portion 258 connecting the thermostat 208 to the main pump 204 through the engine cylinder head 154 and the engine block 150, (ii) a second portion 262 connecting the thermostat 208 to the main pump 204 through the radiator 212, and (iii) a third portion 266 connecting the thermostat 208 to the engine oil heat exchanger 224 through the EGR cooler 128 and the engine cabin heater core 220, (iv) a fourth portion 270 connecting the engine oil heat exchanger 224 to either the secondary pump 216 or the main pump 204 via the two-port valve 254, and (v) a fifth portion 274 connecting the secondary pump 216 to the thermostat 208 through the engine cylinder head 154. The controller 120 is configured to control the coolant system 250 as shown in FIG. 2E to simultaneously perform engine coolant stagnation and EGR cooler cooling by closing the thermostat 208, disconnecting the main pump 204 from the crankshaft 158 or de-energizing the electric motor 206, energizing the secondary pump 216, and opening the two-port valve 254 to (i) prevent coolant flow through the first portion 258 of the coolant circuit thereby stagnating coolant in the engine block 150, (ii) prevent coolant flow through the second and fourth portions 262, 270 of the coolant circuit, (iii) provide coolant flow through the third and fifth portions 266, 274 of the coolant circuit to cool the EGR cooler 128 and the engine cylinder head 154.

Figure 2F:
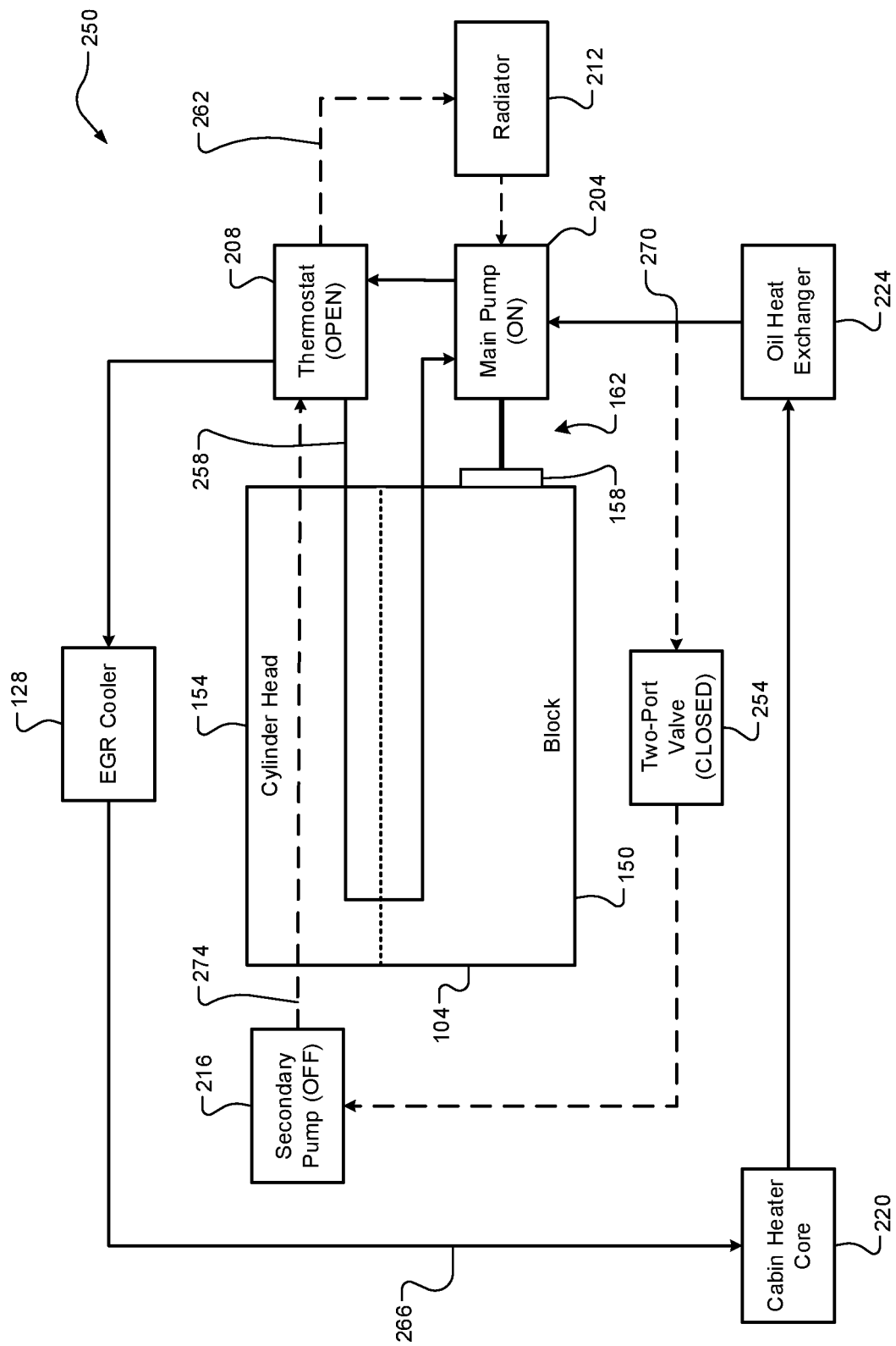
Figure 3B:
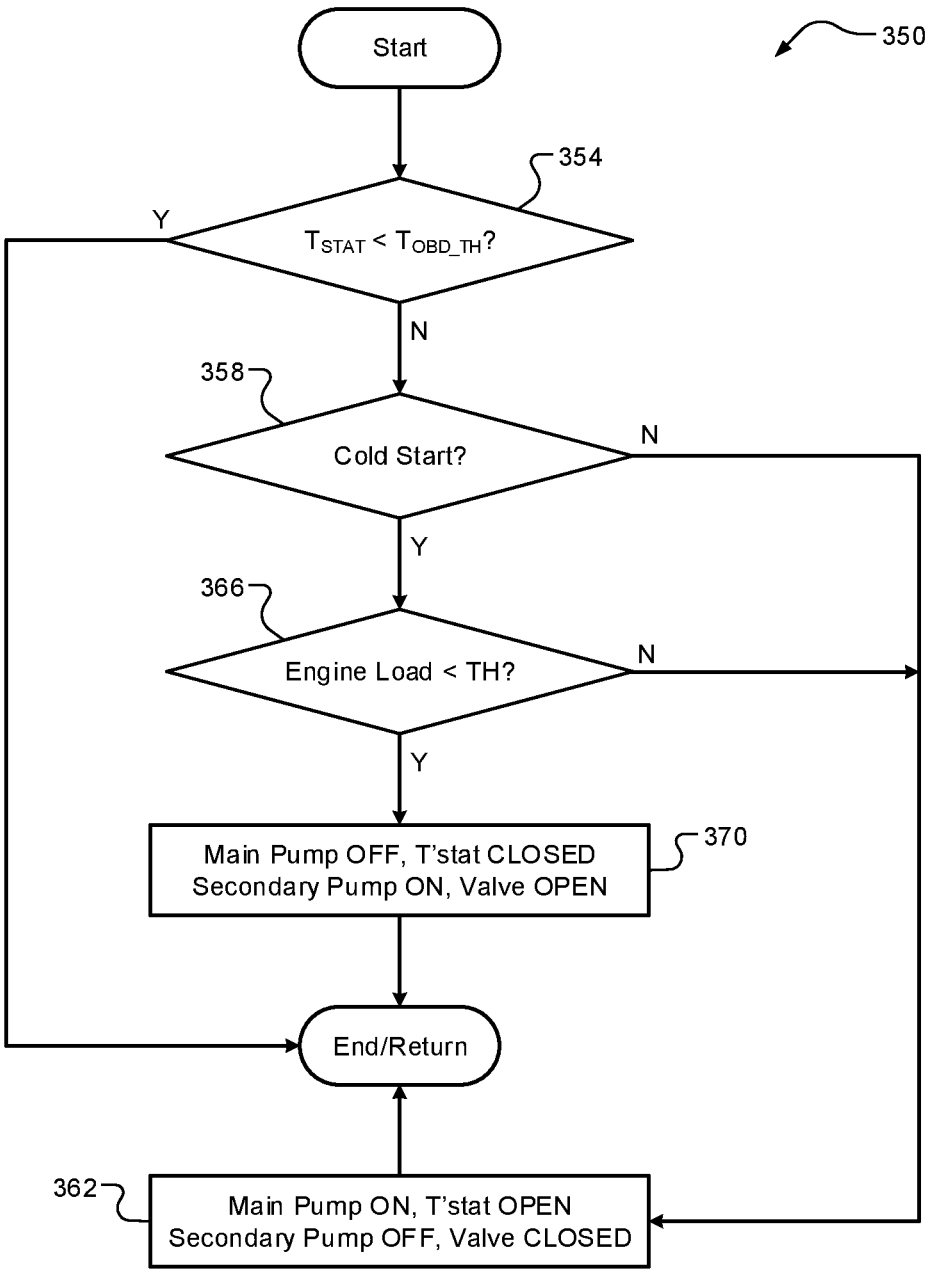

After the cold start of the engine 104, the controller 120 is configured control the coolant system 120 as shown in FIG. 2F to stop engine coolant stagnation and continue EGR cooler cooling by de-energizing the secondary pump 216, closing the two-port valve 254, opening the thermostat 208, and reconnecting the main pump 204 to the crankshaft 154 or re-energizing the electric motor 206 to provide coolant flow through the first, second, third, and fourth portions 258, 262, 266, and 270 of the coolant circuit. Referring now to FIG. 3B, a corresponding method 350 is illustrated. At 354, the controller 120 could optionally check that a set of preconditions are satisfied, such as the thermostat temperature ($T_{STAT}$) satisfying an on-board diagnostic temperature threshold ($T_{OBD\_TH}$). At 358, the controller 120 determines whether a cold start of the engine 104 is occurring. When false, the method 350 proceeds to 362 where the main pump is connected to the crankshaft 158 or the electric motor 206 is energized (ON), the thermostat 208 ("t'stat") is open (OPEN), the secondary pump 216 is de-energized (OFF), and the two-port valve 254 ("Valve") is closed (CLOSED). It will be appreciated that the secondary pump 216 could also run in addition to the main pump 204 (including opening the two-port valve 254), such as in cases where higher rates of coolant flow are necessary. The method 350 then ends or returns for one or more additional cycles. When a cold start of the engine 104 is occurring, the method 350 proceeds to 366 where the controller 120 determines whether the engine load is less than a threshold (TH). When false, the method 300 proceeds to 362. Otherwise, the method 350 proceeds to 370 where the main pump 204 is disconnected from the crankshaft 158 or the electric motor 206 is de-energized (OFF), the thermostat 208 is closed (CLOSED), the secondary pump 216 is energized (ON), and the two-port valve 254 is open (OPEN). The method 350 then ends or returns for one or more additional cycles.

In some implementations, the above-described configuration could be used or modified for use to prioritize coolant flow to the engine cabin heater core 220 based on a current mode of the HVAC system 136 (e.g., as selected by a driver of the vehicle 100). For example, during an "off" or cooling mode (e.g., air conditioning) of the HVAC system 136, coolant flow through the engine cabin heater core 220 could be blocked (e.g., using additional flow control valves). Alternatively, for example, during an "on" or heating mode (e.g., defrost or heater) of the HVAC system 136, coolant flow through the engine cabin heater 220 core could be prioritized or allowed. The same coolant flow prioritization and stoppage could also be applied to the EGR cooler 128 and/or the engine oil heat exchanger. For example, to improve warm-up performance during coolant stagnation, coolant flow through the engine cabin heater core 220 could be prevented to prioritize flow to the engine oil heat exchanger 224 and/or the EGR cooler 128. This flow prioritization to the engine oil heat exchanger 224 and/or the EGR cooler 128 could achieve, for example, improved fuel economy and/or reduced greenhouse gas (GHG) emissions, which could potentially earn a GHG credit.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A coolant system for an engine of a vehicle, the coolant system comprising:
    a coolant circuit configured to flow coolant through both a block of the engine and an exhaust gas recirculation (EGR) cooler of a cooled EGR (CEGR) system of the engine;
    a main pump on the coolant circuit that is selectively driven by an electric motor or a crankshaft of the engine to pump coolant through the engine block;
    a secondary pump on the coolant circuit that, when energized, is configured to pump coolant through the coolant circuit; and
    a controller of the engine configured to simultaneously perform engine coolant stagnation and EGR cooler cooling during a cold start of the engine by:
        de-energizing the electric motor or disconnecting the main pump from the engine crankshaft to stagnate coolant in the engine block to increase engine bore temperature, decrease piston friction, and increase engine fuel economy during cold starts of the engine; and
        energizing the secondary pump to flow coolant through the EGR cooler of the CEGR system to recirculate cooled exhaust gas to an induction system of the engine to decrease cylinder pumping losses and increase engine fuel economy, wherein the coolant circuit comprises:

a first portion connecting a thermostat valve to the main pump through a cylinder head of the engine and the engine block;

a second portion connecting the thermostat valve to the main pump through a radiator of the engine; and a third portion connecting the thermostat valve to the main pump through the EGR cooler, a cabin heater core of the engine, the secondary pump, and an oil heat exchanger of the engine.

2. The coolant system of claim 1, wherein the coolant circuit is a single coolant circuit that provides for both engine block coolant stagnation and EGR cooler coolant flow.

3. The coolant system of claim 1, wherein the controller is configured to simultaneously perform engine coolant stagnation and EGR cooler cooling by closing the thermostat valve, de-energizing the electric motor or disconnecting the main pump from the engine crankshaft, and energizing the secondary pump to (i) prevent coolant flow through the first portion of the coolant circuit thereby stagnating coolant in the engine cylinder head and the engine block, (ii) prevent coolant flow through the second portion of the coolant circuit, and (iii) provide coolant flow through the third portion of the coolant circuit to cool the EGR cooler.

4. The coolant system of claim 1, wherein after the cold start of the engine, the controller is further configured to stop engine coolant stagnation and continue EGR cooler cooling by de-energizing the secondary pump, opening the thermostat valve, and re-energizing the electric motor or reconnecting the main pump to the engine crankshaft to provide coolant flow through the first, second, and third portions of the coolant circuit.

5. A coolant system for an engine of a vehicle, the coolant system comprising:

a coolant circuit configured to flow coolant through both a block of the engine and an exhaust gas recirculation (EGR) cooler of a cooled EGR (CEGR) system of the engine;

a main pump on the coolant circuit that is selectively driven by an electric motor or a crankshaft of the engine to pump coolant through the engine block;

a secondary pump on the coolant circuit that, when energized, is configured to pump coolant through the coolant circuit; and a controller of the engine configured to simultaneously perform engine coolant stagnation and EGR cooler cooling during a cold start of the engine by:

de-energizing the electric motor or disconnecting the main pump from the engine crankshaft to stagnate coolant in the engine block to increase engine bore temperature, decrease piston friction, and increase engine fuel economy during cold starts of the engine; and energizing the secondary pump to flow coolant through the EGR cooler of the CEGR system to recirculate cooled exhaust gas to an induction system of the engine to decrease cylinder pumping losses and increase engine fuel economy, wherein the coolant circuit comprises:

a first portion connecting a thermostat valve to the main pump through a cylinder head of the engine and the engine block;

a second portion connecting the thermostat valve to the main pump through a radiator of the engine;

a third portion connecting the thermostat valve to an oil heat exchanger of the engine through the EGR cooler and a cabin heater core of the engine;

a fourth portion connecting the engine oil heat exchanger to either the main pump or the secondary pump through a two-port valve; and a fifth portion connecting the secondary pump to the thermostat valve through the engine cylinder head.

6. The coolant system of claim 5, wherein the controller is configured to simultaneously perform engine coolant stagnation and EGR cooler cooling by closing the thermostat valve, de-energizing the electric motor or disconnecting the main pump from the engine crankshaft, opening the two-port valve, and energizing the secondary pump to (i) prevent coolant flow through the first portion of the coolant circuit thereby stagnating coolant in the engine block, (ii) prevent coolant flow through the second and fourth portions of the coolant circuit, (iii) provide coolant flow through the third and fifth portions of the coolant circuit to cool the EGR cooler.

7. The coolant system of claim 5, wherein after the cold start of the engine, the controller is further configured to stop engine coolant stagnation and continue EGR cooler cooling by de-energizing the secondary pump, closing the two-port valve opening the thermostat valve, and re-energizing the electric motor or reconnecting the main pump to the engine crankshaft to provide coolant flow through the first, second, third, and fourth portions of the coolant circuit.

8. The coolant system of claim 5, wherein flow is stopped to the engine cabin heater core when a current mode of a heating, ventilating, and air conditioning (HVAC) system of the vehicle is an off or cooling mode, and wherein flow is prioritized to the cabin heater core when the current mode of the HVAC system is a defrost or heating mode.

9. The coolant system of claim 1, wherein the engine further comprises a turbocharger, and wherein the coolant circuit is further configured to selectively flow coolant through the turbocharger.

10. A method of simultaneously performing engine coolant stagnation and EGR cooler cooling in an engine of a vehicle, the method comprising:

providing a coolant system comprising:

a coolant circuit configured to flow coolant through both a block of the engine and an exhaust gas recirculation (EGR) cooler of a cooled EGR (CEGR) system of the engine, a main pump on the coolant circuit that is driven by an electric motor or a crankshaft of the engine to pump coolant through the engine block, and a secondary pump on the coolant circuit that, when energized, is configured to pump coolant through the coolant circuit; and during a cold start of the engine:

de-energizing or disconnecting, by a controller, the electric motor or the main pump from the engine crankshaft, respectively, to stagnate coolant in the engine block to increase engine bore temperature, decrease piston friction, and increase engine fuel economy during cold starts of the engine; and energizing, by the controller, the secondary pump to flow coolant through the EGR cooler of the CEGR system to recirculate cooled exhaust gas to an induction system of the engine to decrease cylinder pumping losses and increase engine fuel economy, wherein the coolant circuit comprises:

a first portion connecting a thermostat valve to the main pump through a cylinder head of the engine and the engine block;

a second portion connecting the thermostat valve to the main pump through a radiator of the engine; and a third portion connecting the thermostat valve to the main pump through the EGR cooler, a cabin heater core of the engine, the secondary pump, and an oil heat exchanger of the engine.

11. The method of claim 10, wherein the coolant circuit is a single coolant circuit that provides for both engine block coolant stagnation and EGR cooler coolant flow.

12. The method of claim 10, wherein simultaneously performing engine coolant stagnation and EGR cooler cooling comprises, by the controller, closing the thermostat valve, de-energizing the electric motor or disconnecting the main pump from the engine crankshaft, and energizing the secondary pump to (i) prevent coolant flow through the first portion of the coolant circuit thereby stagnating coolant in the engine cylinder head and the engine block, (ii) prevent coolant flow through the second portion of the coolant circuit, and (iii) provide coolant flow through the third portion of the coolant circuit to cool the EGR cooler.

13. The method of claim 10, further comprising after the cold start of the engine, stopping, by the controller, engine coolant stagnation and continue EGR cooler cooling by de-energizing the secondary pump, opening the thermostat valve, and re-energizing the electric motor or reconnecting the main pump to the engine crankshaft to provide coolant flow through the first, second, and third portions of the coolant circuit.

14. The method of claim 10, wherein the coolant circuit comprises:

a first portion connecting a thermostat valve to the main pump through a cylinder head of the engine and the engine block;

a second portion connecting the thermostat valve to the main pump through a radiator of the engine;

a third portion connecting the thermostat valve to an oil heat exchanger of the engine through the EGR cooler and a cabin heater core of the engine;

a fourth portion connecting the engine oil heat exchanger to either the main pump or the secondary pump through a two-port valve; and a fifth portion connecting the secondary pump to the thermostat valve through the engine cylinder head.

15. The method of claim 14, wherein simultaneously performing engine coolant stagnation and EGR cooler cooling comprises, by the controller, closing the thermostat valve, de-energizing the electric motor or disconnecting the main pump from the engine crankshaft, opening the two-port valve, and energizing the secondary pump to (i) prevent coolant flow through the first portion of the coolant circuit thereby stagnating coolant in the engine block, (ii) prevent coolant flow through the second and fourth portions of the coolant circuit, (iii) provide coolant flow through the third and fifth portions of the coolant circuit to cool the EGR cooler.

16. The method of claim 14, further comprising after the cold start of the engine, stopping, by the controller, engine coolant stagnation and continue EGR cooler cooling by de-energizing the secondary pump, closing the two-port valve opening the thermostat valve, and re-energizing the electric motor or reconnecting the main pump to the engine crankshaft to provide coolant flow through the first, second, third, and fourth portions of the coolant circuit.

17. The method of claim 14, wherein flow is stopped to the engine cabin heater core when a current mode of a heating, ventilating, and air conditioning (HVAC) system of the vehicle is an off or cooling mode, and wherein flow is prioritized to the cabin heater core when the current mode of the HVAC system is a defrost or heating mode.

18. The method of claim 10, wherein the engine further comprises a turbocharger, and wherein the coolant circuit is further configured to selectively flow coolant through the turbocharger.

* * * * *